Patented Nov. 21, 1933

1,936,453

UNITED STATES PATENT OFFICE 1,936,453

PURIFICATION OF PARAFFIN WAX

Hans Klein, Mannheim, Hans Kaehler, Oppau, and Hermann Zorn, Ludwigshafen-on-the-Rhine, Germany, assignors to I. G. Farbenindustrie Aktiengesellschaft, Frankfort-on-the-Main, Germany No Drawing. Application January 5, 1931, Serial No. 506,740, and in Germany January 17, 1930

5 Claims. (Cl. 196—20)

The present invention relates to the purification or separation of mixtures of fatty or mineral oils or distillation or destructive hydrogenation products of coal and the like especially of carbonaceous materials containing substantial amounts of paraffin wax. For the purification or separation of mixtures of fatty or mineral oils or distillation or hydrogenation products of coals or other carbonaceous materials solvents consisting substantially of a formate of the lower alcohols of the fatty series or mixtures of several formates have already been employed.

It has been further found that in the recovery of paraffin wax from materials containing substantial amounts thereof together with other carbonaceous substances, such as mineral oils and the like, for example from distillation or hydrogenation products of carbonaceous materials, such as coal, or from crude paraffin waxes with the aid of formates of lower alcohols, the paraffin wax obtained is sometimes not quite colourless, because the solvent power of these esters for asphaltic bodies, such as asphalt and other coloured or colouring constituents or asphalt-like bodies having a lower molecular weight than asphalt and which may be distilled, but which condense after some time with the formation of substances similar to asphalt, is not always sufficient wholly to prevent the precipitation of these substances on the paraffin wax to be separated.

We have now found that the said objection is readily obviated by employing the mixtures of the said formates with organic solvents, the solvent power of which for the said asphaltic bodies is greater than that of the formates, as for example mixtures of the said formate with benzene, benzine, carbon disulphide, carbon tetrachloride and the like. Usually it is only necessary to add small amounts of these solvents, for example from 2 to 20 per cent reckoned on the amount of the purifying mixture employed, in order to improve the quality of the paraffin wax. The solvent power of the said mixtures for paraffin wax is very small even when employing benzine.

The solvent mixtures may also be employed for the purification of fatty or mineral oils, as for example soy bean oil.

The process may be carried out by adding the said solvent mixtures to the product to be purified. The contaminating substances pass into solutions which may then be separated from the remaining purified product, as for example the paraffin wax or the pure oil. In the case of recovering paraffin wax, the latter may be subsequently washed with the same mixture and the solvent recovered from the filtrate by distillation.

Crude paraffin wax from any source may be purified in an advantageous manner by the process according to the present invention. When stirring the same with the solvent mixture it is preferably warmed, but good results are also obtained at room temperature. The treatment may also be carried out at temperatures above the temperature at which the solvent mixture commences to boil provided a closed vessel is used. The said solvent mixture may also contain more than two components, in particular it may be used in conjunction with the solvents hitherto usually employed for this purpose, for example benzine, benzene, toluene, xylene, carbon disulphide, carbon tetrachloride, trichloroethylene or pyridine. Thus for example a mixture of 80 per cent by volume of methyl formate, 15 per cent of benzene and 5 per cent of methanol gives very good results. In many cases it is preferable to carry out the treatment of the masses containing paraffin in stages, solvent mixtures of the said kind, if desired of different composition or different concentration, being used in the single stages. Different solvents which only consist of the one component may also be used one after another, for example treatment with a formate of a lower alcohol constituting the first stage followed by extraction of colouring matter by treatment with a small quantity of a solvent having a higher solvent power for the said colouring matter.

The following examples will further illustrate the nature of this invention, but the invention is not restricted to these examples. The parts are by weight.

*Example 1*

Brown coal low temperature carbonization tar, which has been freed from pitch by low temperature distillation, is stirred with an equal weight of a mixture of 80 per cent by volume of methyl formate, 15 per cent of benzene and 5 per cent of methanol and the greater part of the solvent is removed by filtration under pressure. After repeating this treatment twice, the remainder of the solvent is removed by heating. The yield of white paraffin wax obtained amounts to 20 per cent by weight of the tar distillate employed.

*Example 2*

A product from the destructive hydrogenation of brown coal low temperature carbonization tar consisting of paraffin wax and oil is centrifuged. The residual impure paraffin wax flakes are washed with a mixture of 80 per cent by volume of methyl formate and 20 per cent by volume of benzene. The paraffin wax obtained is pure white in colour.

*Example 3*

135 parts of a filtrate obtained by filtration in a press at 0° C. of a destructive hydrogenation product of brown coal low temperature carbonization tar are boiled for 15 minutes under a reflux condenser with 200 parts of a mixture of 90 per cent by volume of methyl formate and 10 per cent of light benzine. After cooling to 16° C., the solvent is removed in a filter-press and the residue is washed three times with 60 parts of the same solvent mixture each time. 126 parts of a white paraffin wax are obtained which is so pure that it may be supplied for catalytic oxidation with air without further treatment.

The filtrate is evaporated and yields a yellow-brown residue (7.5 parts).

What we claim is:—

1. A process for the purification of precipitated crude paraffin wax by the removal of impurities comprising oils and colored asphalticlike bodies which comprises washing said wax with a mixture of a formate of a lower alcohol of the fatty series and an organic solvent which has a greater solvent power for asphaltic bodies than said formate selected from the class consisting of benzene, toluene, xylene, benzine, pyridine, trichlorethylene, carbon disulphide and carbon tetrachloride and causing said mixture to effect dissolution of the impurities in said wax to thereby produce an undissolved white wax.

2. A process for the purification of precipitated crude paraffin wax by the removal of impurities comprising oils and colored asphalticlike bodies which comprises washing said wax with a mixture of a formate of a lower alcohol of the fatty series and an organic solvent having a greater solvent power for asphaltic bodies than the said formate and causing said mixture to dissolve said impurities from the wax to thereby produce an undissolved white wax.

3. A process for the purification of precipitated crude paraffin wax by the removal of impurities comprising oils and colored asphalticlike bodies which comprises mixing said wax with a solvent mixture of a formate of a lower alcohol of the fatty series and an organic substance which has a greater solvent power for asphaltic bodies than said formate selected from the class consisting of benzene, toluene, xylene, benzine, pyridine, trichlorethylene, carbon disulphide and carbon tetrachloride and causing said solvent mixture to effect dissolution of the impurities in said wax by heating the resulting reaction mixture to a temperature at which no material dissolution of wax takes place to thereby produce an undissolved white wax.

4. A process for refining precipitated crude paraffin wax by the removal of impurities comprising oils and colored asphalticlike bodies which comprises washing said wax with a mixture consisting of about 80 per cent by volume of methyl formate, 15 per cent of benzene and 5 per cent of methyl alcohol, said benzene and methyl alcohol having a greater solvent power for asphaltic bodies than said formate, and causing the said mixture to dissolve the impurities from the wax to thereby poduce an undissolved white wax.

5. A process as defined in claim 3 wherein said organic substance is present in amounts of from 2 to 20 per cent of the solvent mixture.

HANS KLEIN.
HANS KAEHLER.
HERMANN ZORN.